United States Patent
Sich et al.

[11] Patent Number: 5,823,638
[45] Date of Patent: Oct. 20, 1998

[54] MICROPROCESSOR CONTROLLED ELECTRO-PNEUMATIC BRAKE SYSTEM IN A MULTI-PLATFORM RAILROAD FREIGHT CAR

[75] Inventors: Gary M. Sich; John E. Paul, both of Irwin, Pa.

[73] Assignee: Westinghouse Air Brake Company, Wilmerding, Pa.

[21] Appl. No.: 642,569

[22] Filed: May 3, 1996

[51] Int. Cl.[6] ................................................... B60G 25/00
[52] U.S. Cl. ........................... 303/22.1; 303/3; 303/15; 303/198
[58] Field of Search .................... 303/3, 15, 20, 303/22.1–22.6, 198

[56] References Cited

U.S. PATENT DOCUMENTS

| | | |
|---|---|---|
| 4,804,234 | 2/1989 | Gee et al. ................................ 303/22.1 |
| 5,303,986 | 4/1994 | VanDeMotter et al. ................ 303/22.1 |
| 5,475,596 | 12/1995 | Henry et al. ............................ 303/22.1 |

*Primary Examiner*—Matthew C. Graham
*Attorney, Agent, or Firm*—Gary J. Falce

[57] ABSTRACT

A brake system is provided for a multi-platform railroad car in which a single microprocessor is employed to control the car brakes. In one embodiment, a single electro-pneumatic control unit provides a common brake pressure to the brakes of each truck in accordance with the truck design net brake ratio and load weight of whichever truck requires the lowest brake pressure. In a second embodiment of the invention, the brakes on separate truck sets are provided with different common brake pressures by employing separate electro-pneumatic control units for each truck set under control of the microprocessor. In such an arrangement, the different common brake pressure on one truck set can be increased to make-up at least a portion of a brake deficit on another truck set due to light car loads associated with the other truck set in order to meet or at least closely approach the commanded net braking ratio for the entire multi-platform car.

14 Claims, 5 Drawing Sheets

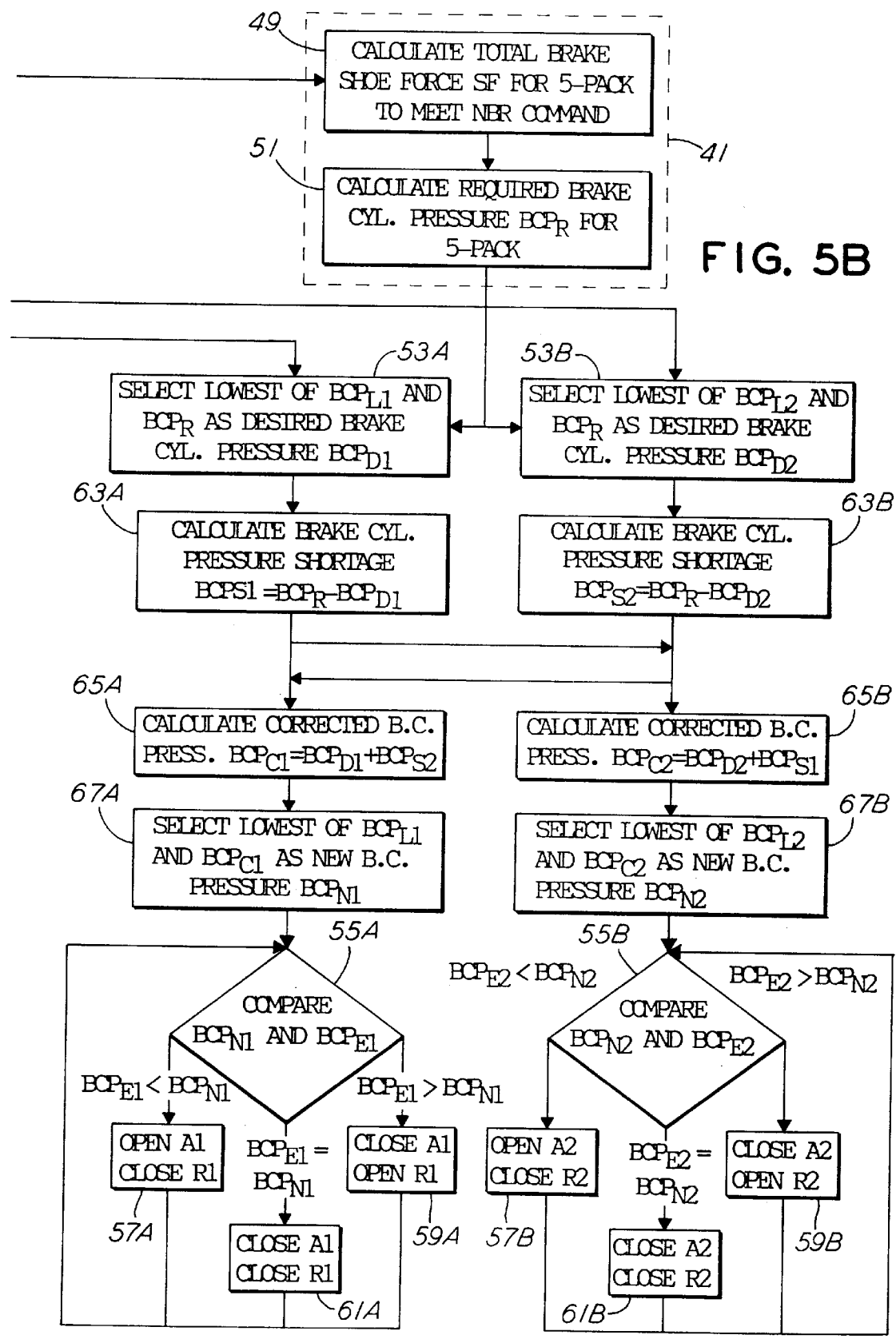

MICROPROCESSOR CONTROLLED ELECTRO-PNEUMATIC BRAKE SYSTEM IN A MULTI-PLATFORM RAILROAD FREIGHT CAR

BACKGROUND OF THE INVENTION

The present invention relates to microprocessor based electro-pneumatic brake control systems for railroad freight cars and particularly to such brake control systems for multi-platform type railroad freight cars.

Co-pending application, Ser. No. 08/493,606, assigned to the assignee of the present invention, and incorporated herein by reference, discloses an electro-pneumatic brake control system for a railroad freight car in which braking force is near-instantaneously initiated at the cars of a train taking into account the respective car designed net braking ratio, so that essentially uniform retardation of the respective cars is achieved. This implies different brake forces at the respective cars to compensate for such variables as brake rigging design and car loading, which influence retardation. A microprocessor is employed on each car in conjunction with appropriate solenoid valves for controlling the car brake pressure.

Multi-platform type specialty freight cars, such as "5-packs", are a popular means for transporting intermodal containers. These specialty cars are efficient in their design in that individual platforms share trucks and are semi-permanently coupled together.

One object of the present invention contemplates a further improvement in efficiency by designing the brake system so that only a single microprocessor is required for the entire multi-platform freight car.

Since the end trucks of a typical "5-pack" multi-platform car have different design net braking ratios and the respective platforms may carry different loads, different optimum brake forces may be required at the several trucks of a given multi-platform car in order to avoid sliding the wheels of a truck having a relatively light load and/or a high design net braking ratio.

It is therefore an extension of the foregoing object to provide a common brake force for each truck of a multi-platform car or for each truck of a specific group of trucks that is limited to a value that will not induce wheel slide on any truck, yet will still produce a net braking ratio for the multi-platform car as a whole that closely approaches the commanded net braking ratio.

In carrying out these objectives there is provided for a multi-platform railroad car a microprocessor based brake control system in which the microprocessor is programmed to calculate a maximum allowable brake cylinder pressure for each of a specified number of trucks based on the truck load condition and design net braking ratio. The lowest of the calculated maximum allowable brake pressures for the specified number of trucks is then selected as the maximum value at which the allowable brake pressure is limited. If this limit is less than the brake pressure required to provide a total net braking ratio for the multi-platform car corresponding to the net braking ratio command, this limit establishes the pressure at which each truck is braked. Otherwise, the brake pressure required to provide the commanded net braking ratio for the multi-platform car is effective at each truck.

BRIEF DESCRIPTION OF THE DRAWINGS

The foregoing objects and other objects and advantages of the invention will become apparent from the following more detailed explanation when taken in connection with the accompanying drawings in which:

FIGS. 5A and 5B together show is a flow chart depicting the various steps for which the microprocessor of FIG. 4 is programmed in accordance with the second embodiment of the invention.

DESCRIPTION AND OPERATION

Figure 1:
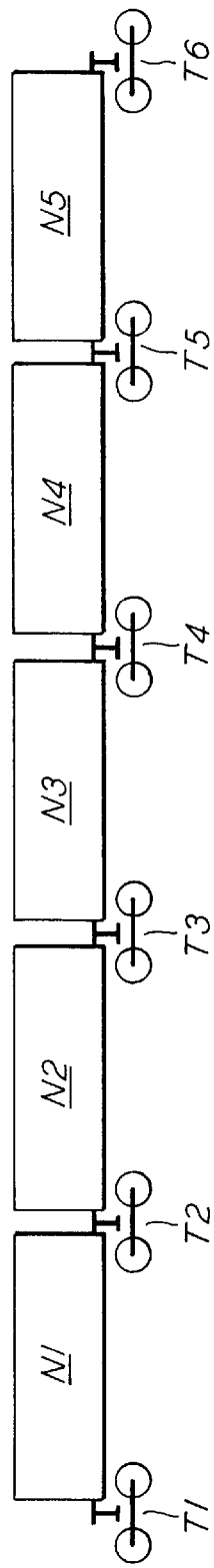
FIG. 1 is a diagrammatic view of a multi-platform railroad car for which the present invention is applicable.

Referring to FIG. 1, there is shown one example of a multi-platform railroad freight car 10 commonly referred to as a "5-pack", since five separate platforms N1, N2, N3, N4 and N5 are coupled together in a semi-permanent configuration in which adjoining platforms share a truck T2, T3, T4, and T5. While five such separate platforms are typical, other configurations having more or less then five platforms may also be adapted to the brake system of the present invention. Typically the end trucks T1, T6 in a "5-pack" configuration have a brake rigging designed to produce a lower net braking ratio than the brake rigging of the intermediate trucks under the same conditions of brake cylinder pressure versus car weight.

Figure 2:
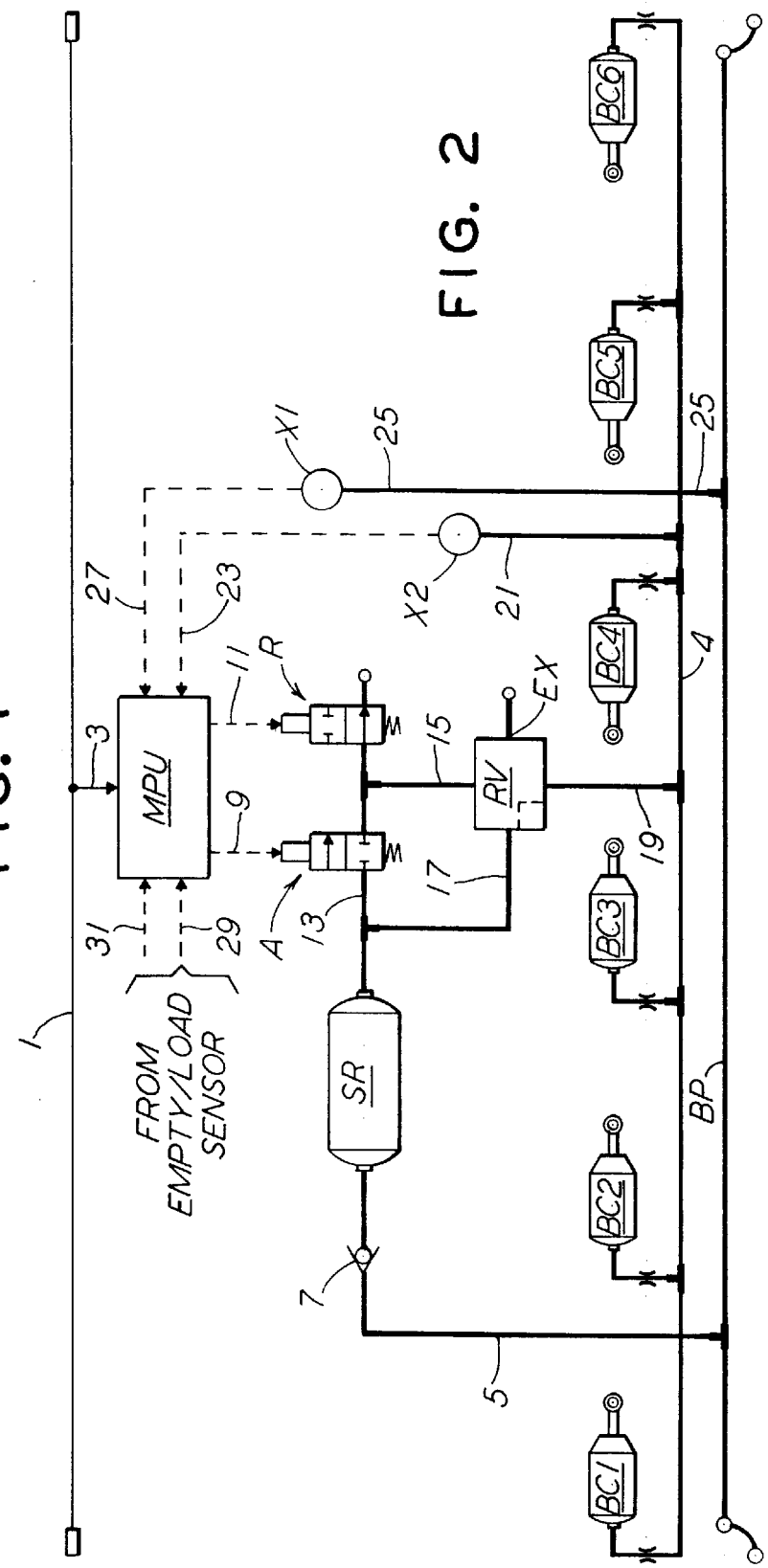
FIG. 2 is a schematic of a microprocessor based, electro-pneumatic brake system comprising a first embodiment of the invention.

As shown in FIG. 2, the brake system of the present invention includes for the entire "5-pack" car 10 a single microprocessor unit MPU to which a train line wire 1 is connected via a branch wire 3, an application electro-magnet valve A, a release electro-magnet valve R, a relay valve RV, such as a commonly known J-type relay valve manufactured by the Westinghouse Air Brake Co., a brake cylinder pipe 4 to which is connected a brake cylinder BC1, BC2, BC3, BC4, BC5 and BC6, each such brake cylinder being associated with the brake rigging of a respective truck, and a supply reservoir SR to which a train line brake pipe BP is connected via a branch pipe 5 and a one-way check valve 7 to maintain supply reservoir SR charged to the pressure carried in brake pipe BP. Application electro-magnet valve A and release electro-magnet valve R are controlled by microprocessor unit MPU via wires 9 and 11. Application electromagnet valve A is a normally closed, two-position, two-way, solenoid operated valve having a spring return, while release electro-magnet valve R is a normally open, two-position, two-way, solenoid operated valve having a spring return. The inlet port of application electro-magnet valve A is connected by a pipe 13 to supply reservoir SR, and the outlet port is connected by a pipe 15 to the control port of relay valve RV and to the inlet port of release electro-magnet valve R. The outlet port of release electromagnet valve R is vented to atmosphere. The supply port of relay valve RV is connected by a pipe 17 to supply reservoir SR, a delivery port is connected by a pipe 19 to brake cylinder pipe 4, and the relay valve exhaust port EX is vented to atmosphere. A pressure to electric transducer X1 is connected by a pipe 21 to brake cylinder pipe 4 and by a wire 23 to microprocessor unit MPU. Another pressure to electric transducer X2 is connected by a pipe 25 to brake pipe BP and by a wire 27 to microprocessor unit MPU. An input 29 of microprocessor unit MPU receives empty/load signals according to the car weight supported by each truck T1–T6. Additional car parameters, as discussed in the referencing application, are connected to microprocessor unit MPU at input 31. These parameters include the number of platforms and trucks comprising "5-pack" car 10, the gross rail load and empty load weight of "5-pack" car 10, the maximum empty net braking ratio $NBR_{FSE}$; the design net braking ratio $NBR_{50}$ of end trucks T1 and T6; and the design net braking ratio $NBR_{50}$ of intermediate trucks T2–T5.

When a brake application is called for, microprocessor unit MPU energizes, wires 9 and 11, causing the solenoid operators to switch positions of the respective application and release electro-magnet valves. The release electro-magnet valve R is thus closed and the application electro-magnet valve A opens to conduct compressed air from supply reservoir SR to relay valve RV, which is accordingly piloted to its application position in a well-known manner. In application position, relay valve RV conducts compressed air from supply reservoir SR to brake cylinder pipe 4. Pressure transducer X1 provides feedback information to microprocessor MPU corresponding to the instantaneous pressure at brake cylinder pipe 4, as an indication of the respective brake cylinder pressures.

When the desired pressure is reached at the respective brake cylinders BC1–BC6, wire 9 is de-energized to drop out the solenoid of application magnet valve A, which is accordingly spring returned to its closed position to cut off further supply of air to the control port of relay valve RV. This in turn causes relay valve RV to terminate further buildup of brake cylinder pressure, by reason of an internal feedback loop that is subject to the effective brake cylinder pressure, thereby effecting a lap condition of the brakes.

When release of the brake application is desired, microprocessor unit MPU de-energizes wires 9 and 11, causing both of the electro-magnet valves A and R to assume the positions shown, in which supply reservoir pressure is cut-off from the relay valve control port, which is concurrently vented to atmosphere via release magnet valve R. This in turn causes relay valve RV to move to its release position in which the brake application pressure effective in brake cylinders BC1–BC6 is exhausted via pipes 4, 19 and the relay valve exhaust port EX.

In accordance with the present invention, the operation of microprocessor unit MPU in regulating the brake cylinder pressure to avoid sliding the wheels of any truck T1–T6 will now be explained in accordance with the flow chart of FIG. 3.

Preliminary to such operation, microprocessor MPU receives the various parameters as hereinbefore mentioned relative to input 31, as well as the empty/load condition of each car N at input 29.

Figure 3:
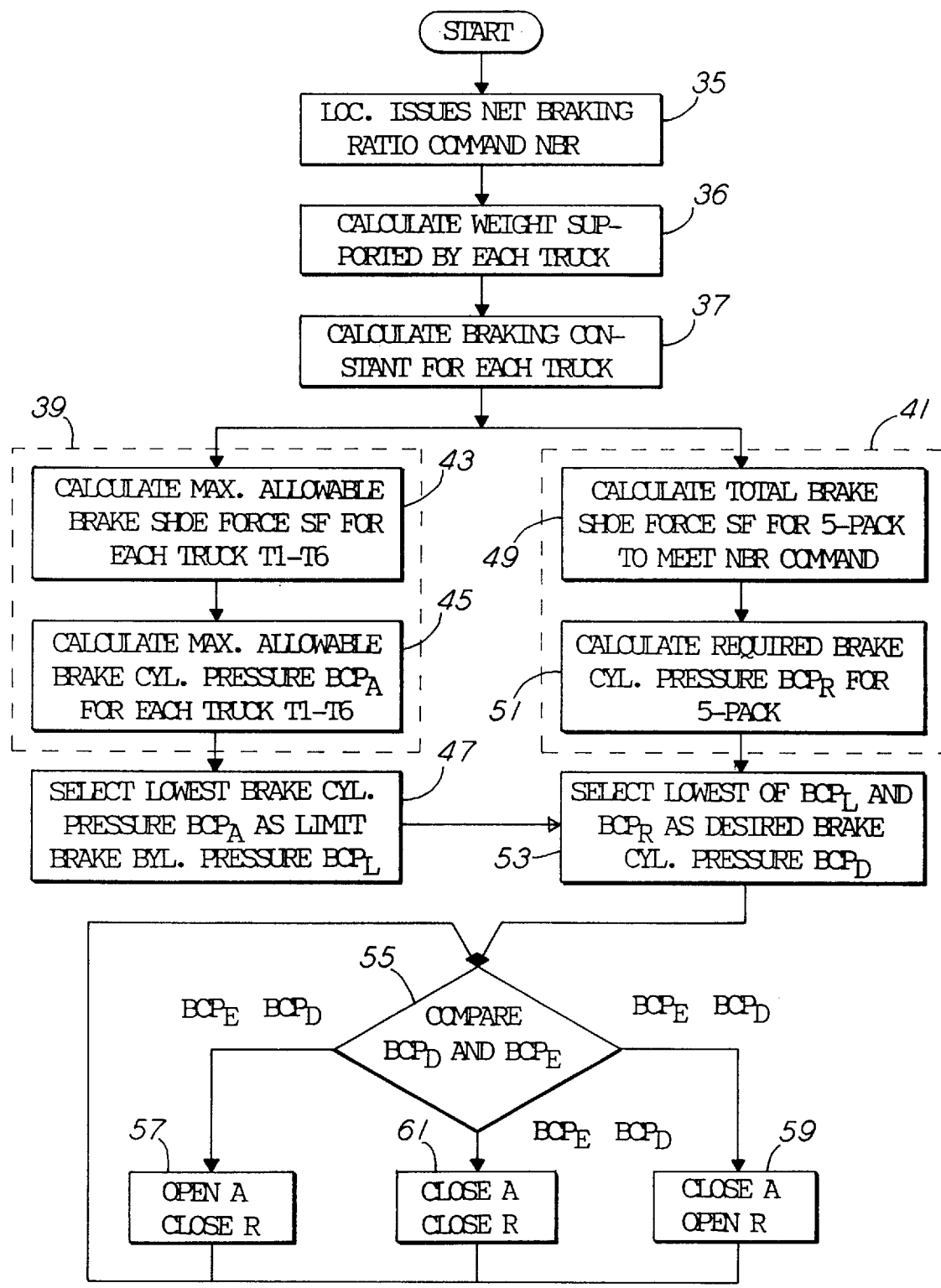
FIG. 3 is a flow chart depicting the various steps for which the microprocessor of FIG. 2 is programmed, in accordance with the first embodiment of the invention.

Referring now to the flow chart of FIG. 3, a net brake ratio command signal NBR is received from the locomotive at microprocessor MPU, as indicated at function block 35. As the routine progresses to block 36, the weight supported by each truck T1–T6 is calculated. In that trucks T2–T5 share the weight of adjacent platforms that are supported at the coupling therebetween, half the weight of each of two adjoining platforms N1–N2, N2–N3, N3–N4 and N4–N5 is considered to be supported by the respective trucks. On the other hand, trucks T1 and T6 being end trucks, only half the weight of a single platform N1 and N5 is considered to be supported by the respective end trucks.

The operating routine next calculates at block 37 the braking constant K for each truck T1–T6 using 50 psi brake cylinder pressure and the full car load weight on which the design net braking ratio $NBR_{50}$ of a respective truck is based.

As is well known to those skilled in the railroad art, net braking ratio NBR for a railroad car is a function of brake shoe force and the weight of the car being braked. Thus, net braking ratio may be defined by equation #1, as follows:

$$NBR = \frac{SF}{WT} \tag{1}$$

where, SF is the shoe force, and WT is the car load.

Since shoe force is a function of brake cylinder pressure, shoe force SF may be expressed in accordance with the following equation:

$$SF = P \cdot L \cdot A \cdot N \cdot E \tag{2}$$

where P is the brake cylinder pressure, L is the leverage ratio of the brake rigging, A is the effective area of the brake cylinder piston subject to brake cylinder pressure, N is the number of cylinders, and E is the brake rigging efficiency.

Assuming that the efficiency E remains constant, only the brake cylinder pressure P varies, so that the factors L·A·N·E in equation #1 may be represented as a constant K. Thus, equation #2 becomes:

$$SF = P \cdot K \text{ or } P = \frac{SF}{K} \tag{3}$$

It is also well known that each truck of a railroad car is designed to have a predetermined net braking ratio based on 50 psi brake cylinder pressure, (which corresponds to a full service brake application when the car brake pipe is charged to 70 psi) and a full load weight $WT_{FL}$. Such predetermined net braking ratio is referred to as the design net braking ratio $NBR_{50}$.

In that the design net braking ration $NBR_{50}$ is based on 50 psi brake cylinder pressure, shoe force SF in equation #3 may be expressed as 50×(K). Equation #1 may thus be written:

$$NBR_{50} = \frac{50(K)}{WT_{FL}} \text{ or } K = \frac{NBR_{50} \times WT_{50}}{50} \tag{4}$$

The braking constant for each truck is thus calculated in accordance with block 37 using equation #4. In that the calculated braking constant K may be considered a fixed value, shoe force SF can only be varied by regulating the brake cylinder pressure P.

Braking constant K for each truck is stored in microprocessor MPU for use in determining the maximum allowable brake cylinder pressure $BCP_A$ that will not result in a wheel slide condition at that truck, and the brake cylinder pressure $BCP_R$ required to achieve the commanded "5-pack" net braking ratio NBR. These calculations are carried out in sub-routines 39 and 41 respectively.

In sub-routine 39, a maximum allowable full-service brake shoe force SF is calculated for each truck T1–T6 based on the actual car load weight that a respective truck supports and a predetermined maximum allowable full-service net braking ratio parameter $NBR_{FSE}$, as indicated at function block 43. This maximum allowable full-service truck shoe force SF may be found from equation #1, as follows:

$$NBR = \frac{SF}{WT} \text{ or } SF = NBR \times WT \tag{1}$$

where NBR is the predetermined maximum allowable full-service net braking ratio, as in the case of an empty car load condition; and WT is actual truck load weight.

Having now calculated the maximum full-service shoe force at each truck and knowing the braking constant for such truck, microprocessor MPU calculates the maximum allowable brake cylinder pressure for each truck, as indicated at block 45 and in accordance with equation #3.

The program next progresses from block 45 to block 47, which represents the function of selecting the lowest allowable truck brake cylinder pressure as the maximum pressure to which all of the truck T1–T6 brake cylinder pressures are limited.

Concurrently, sub-routine 41 calculates the total brake shoe force SF required for a given net brake ratio command NBR at which it is desired to brake the "5-pack" 10, as represented at block 49 and based on equation #1. It will be understood that in the case of calculating brake shoe force for the "5-pack", the command NBR becomes the desired net braking ratio and the weight WT is the sum of the actual load weights of each platform N1–N5.

As the sub-routine 41 progresses to block 51, the next function is to calculate the required brake cylinder pressure $BCP_R$ for the "5-pack", as necessary to produce the total shoe force calculated in accordance with block 49. This can be accomplished using equation #3, as follows:

$$P = \frac{SF}{K} \qquad (3)$$

where K is a constant based on the sum of all truck T1–T6 braking constants, and SF is the total shoe force calculated at block 49.

Having now calculated the required "5-pack" brake cylinder pressure $BCP_R$ in accordance with the net brake ratio command NBR via sub-routine 41, and the brake cylinder limit pressure via sub-routine 39, these pressures are compared and the lower pressure is selected as the desired brake cylinder pressure $BCP_D$, as indicated at function block 53.

Next, a comparison is made at decision block 55 to determine whether the existing brake cylinder pressure $BCP_E$ monitored by pressure transducer X1 in FIG. 2 is less than, equal to, or greater than the desired brake cylinder pressure $BCP_D$. The result of this determination establishes the appropriate operation of magnet valves A and R, as depicted at blocks 57, 59 and 61, in order to increase, maintain, or decrease brake cylinder pressure to achieve a pressure consistent with the brake command, yet without exceeding a threshold at which wheel slide would be expected to occur at any truck T1–T6.

A better understanding of the present invention may be had by considering an exemplary multi-platform "5-pack" 10, such as is commonly known as a Maxi-Stack I. This "5-pack" has a gross rail load of 800,000 lbs. and a light or empty weight of 177,000 lbs. For purposes of this example, the maximum allowable full-service net braking ratio on any truck is deemed to be 28%, while the design net braking ratio $NBR_{50}$ of end trucks T1, T6 is 0.0725 and the design net braking ratio of intermediate trucks T2–T5 is 0.0975. These parameters, as well as the number 5 of platforms N and the number 6 of trucks T comprising "5-pack" 10 is set in microprocessor MPU via input 31.

In addition, platforms N2 and N3 are deemed to be completely empty and platforms N1, N4 and N5 fully loaded, such load condition of the respective platforms being detected by appropriate empty/load equipment associated with each truck T1–T6 and transmitted to microprocessor MPU via input 29.

Based on the number of platforms comprising multi-platform car 10 and the gross rail load inputs to microprocessor MPU, the full load weight $WT_{FL}$ of each platform N is calculated to be 800,500÷5 or 160,1000 lbs. In a similar manner, the completely empty weight $WT_{EL}$ of each platform N is calculated to be 177,000÷5 or 35,400 lbs. based on the number of platforms and the empty weight parameter input to microprocessor MPU. In accordance with the exemplary "5-pack" 10, empty platforms N2 and N3 have a load weight of 35,400 lbs. and fully loaded platforms N1, N4 and N5 have a load weight of 160,100 lbs. End trucks T1 and T6 each support half the weight of the respective loaded platforms N1 and N5 or 80,050 lbs. Intermediate truck T2 supports half the weight of loaded platform N1 and empty platform N2 or 97,750 lbs. Intermediate truck T3 supports half the weight of empty platforms N2 and N3 or 35,400 lbs. Intermediate truck T4 supports half the weight of empty platform N3 and loaded platform N4 or 97,750 lbs. Intermediate truck T5 supports the weight of loaded platforms N4 and N5 or 160,100 lbs. These values are all calculated by microprocessor MPU and set in storage.

Using equation #4 and following the routine at block 37, the braking constant of trucks T1, T6 is calculated at 116.0725 and the braking constant of trucks T2, T3, T4 and T5 is calculated at 312.195.

Proceeding to block 43 in sub-routine 39, and using equation #1, the maximum allowable brake shoe force for each truck is calculated based on the actual load weight supported by the truck and the pre-determined maximum allowable net braking ratio $NBR_{FSE}$ parameter of 0.28, which represents a maximum net braking ratio in accordance with a full service brake application on an empty platform that would not normally cause a wheel slide. This maximum allowable brake shoe force for truck T1 is 22,414 lbs., for truck T2 is 27,370 lbs., for truck T3 is 9,912 lbs., for truck T4 is 27,370 lbs., for truck T5 is 44,828 lbs., and for truck T6 is 22,414 lbs.

The routine next passes to block 45 which calls for the function of calculating the maximum allowed brake cylinder pressure for each truck using equation #3. The maximum allowed brake cylinder pressure $BCP_A$ for truck T1 is 193.10 psi, for truck T2 is 87.67 psi, for truck T3 is 31.75 psi, for truck T4 is 87.67 psi, for truck T5 is 143.59 psi, and for truck T6 is 193.10 psi. These values thus represent the maximum brake cylinder pressure that would not cause a wheel slide to occur on a respective truck based on that truck's design net braking ratio $NBR_{50}$ and the platform load weight it supports. Since only a single pair of electro-magnet valves A and R is employed to control the brake cylinder pressure at each truck of "5-pack" 10, it will be appreciated that each individual truck can not be provided with the specific maximum brake cylinder pressure $BCP_A$ allowed therefor. In order to assure that no truck experiences a net braking ratio that exceeds the predetermined maximum allowable net braking ratio $NBR_{FSE}$ of 0.28, the lowest allowable truck brake cylinder pressure $BCP_A$ is selected, as the brake cylinder limit pressure $BCP_L$ in accordance with block 47, for providing the brake force at each truck T1–T6, thus avoiding the occurrence of wheel slide. In the present example, the 31.75 psi maximum allowed brake cylinder pressure $BCP_A$ of truck T3 dictates the maximum brake cylinder pressure $BCP_L$ at which each truck brake cylinder pressure is limited.

In the event net brake ratio command NBR requires a brake cylinder pressure $BCP_R$ that would be less than the selected limit brake cylinder pressure $BCP_L$, the system subroutine 41 will override sub-routine 39 in establishing the desired brake cylinder pressure $BCP_D$. In the present example, the net brake ratio command NBR is assumed to be 0.1. Based on equation #1, and following the direction of function block 49 in sub-routine 41, a total brake shoe force SF for "5-pack" 10 is calculated as 55,110 lbs. based on the net brake ratio command NBR and the sum of the actual load weights of platforms N1–N5.

The actual brake cylinder pressure required at each truck based on the total of the braking constants of all of the trucks T1–T6 and the total required brake shoe force SF, as directed by block 51, is calculated in accordance with equation #3 to be 37.21 psi.

In comparing the limit brake cylinder pressure $BCP_L$ = 31.75 psi and the required brake cylinder pressure $BCP_R$ = 37.21 psi, as directed by block 53, the lowest brake cylinder pressure $BCP_D$ is ultimately selected for braking each truck of the "5-pack" 10. In the present example, this is the limit brake cylinder pressure $BCP_L$. Under different conditions, the selected brake cylinder pressure could, in fact, be the requested brake cylinder pressure $BCP_R$.

In either case, appropriate control of the electromagnetic valves A and R is required to achieve the desired brake cylinder pressure $BCP_D$, in accordance with the existing brake cylinder pressure $BCP_E$ monitored by pressure transducer X1 in FIG. 2, as directed by decision block 55.

Figure 4:
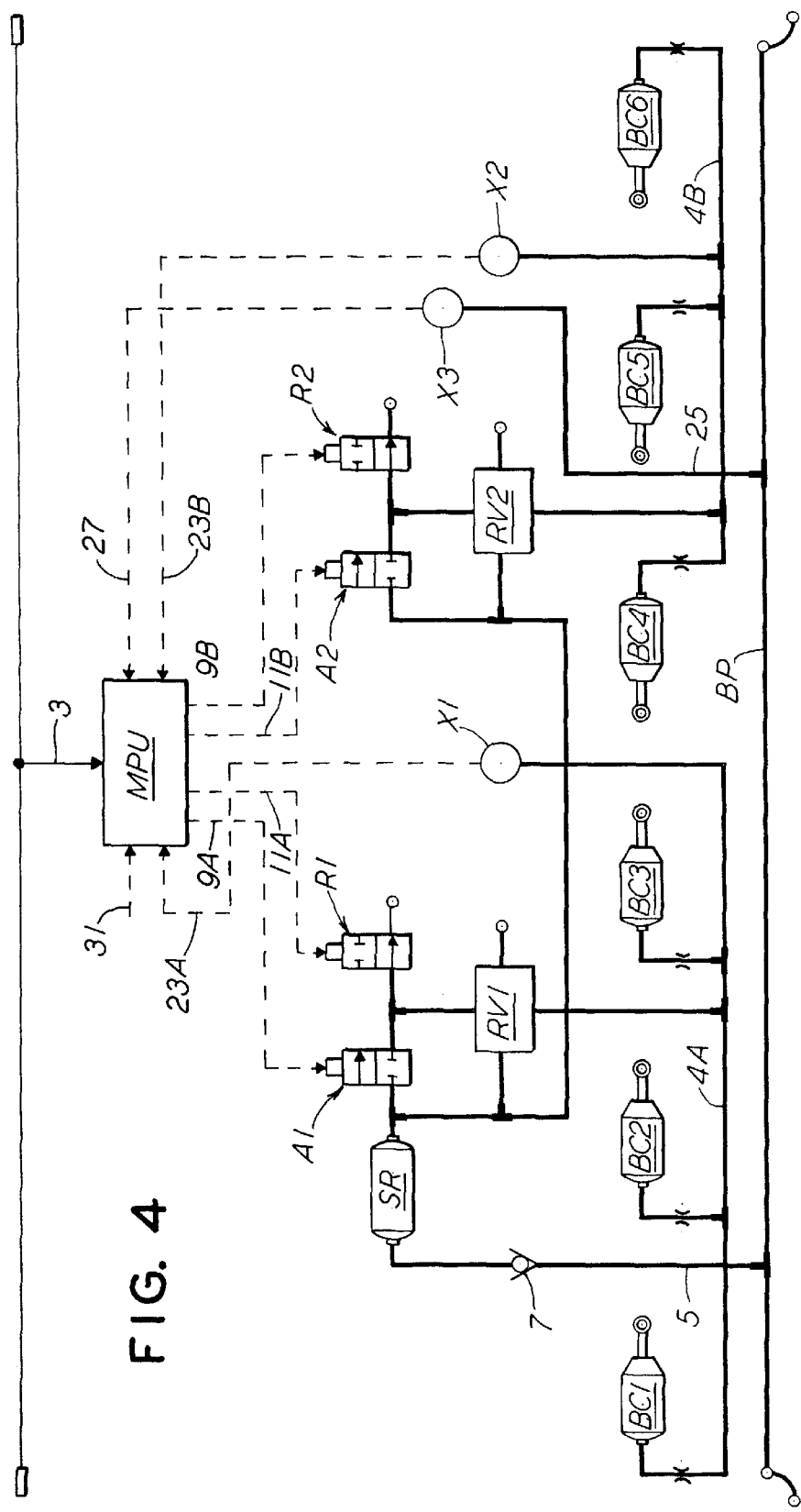
FIG. 4 is a schematic of a micro-processor based brake system comprising a second embodiment of the invention.

In selecting limit pressure $BCP_L$=31.75 psi, a net braking ratio NBR for the "5-pack" is found to be 0.085, whereas the net brake ratio command required a net braking ratio NBR of 0.1. It will be appreciated, therefore, that in accordance with the present invention, brake cylinder pressure can be regulated on a multi-platform railroad car, taking into account different car load configurations and different truck designed net braking ratios, such as to avoid wheel slide without adversely compromising the commanded "5-pack" net braking ratio using only a single brake control system for the entire multi-platform car.

Where it is desired, however, to more closely correlate the actual "5-pack" net braking ratios realized in accordance with the commanded net braking ratio, a further embodiment of the invention may be employed, as shown in FIG. 4. In this embodiment of the invention, the multi-platform, "5-pack" car 10 employs two separate brake control systems under control of a single microprocessor MPU1. Each brake system includes application and release solenoid valves and a relay valve arranged as explained relative to the first embodiment of the invention shown in FIG. 2, but controlling the brake cylinder pressure at only three trucks instead of six.

As shown in FIG. 4, the first control system controls brake cylinder pressure at trucks T1, T2 and T3 having brake cylinders BC1, BC2 and BC3 respectively. The second control system controls brake cylinder pressure at trucks T4, T5 and T6 having brake cylinders BC4, BC5 and BC6 respectively. Brake cylinder pipe 4 is thus separated into a first segment 4A and a second segment 4B. Also, two brake cylinder pressure transducers are provided, transducer X1 connected to brake cylinder pipe segment 4A and transducer X2 connected to brake cylinder pipe segment 4B. Also connected respectively to brake cylinder pipe segments 4A and 4B are a pair of relay valve devices RV1 and RV2, each having a control port to which is connected control pressure from application and release solenoid valves A1,R1 and A2,R2 respectively. Both sets of solenoid valves A1,R1 and A2,R2 are controlled by microprocessor MPU1 via wires 9A, 11A and 9B, 11B. In that these solenoid valves and the relay valve of each control system operate in the same manner as explained relative to FIG. 2, no further explanation should be necessary.

Figure 5A:
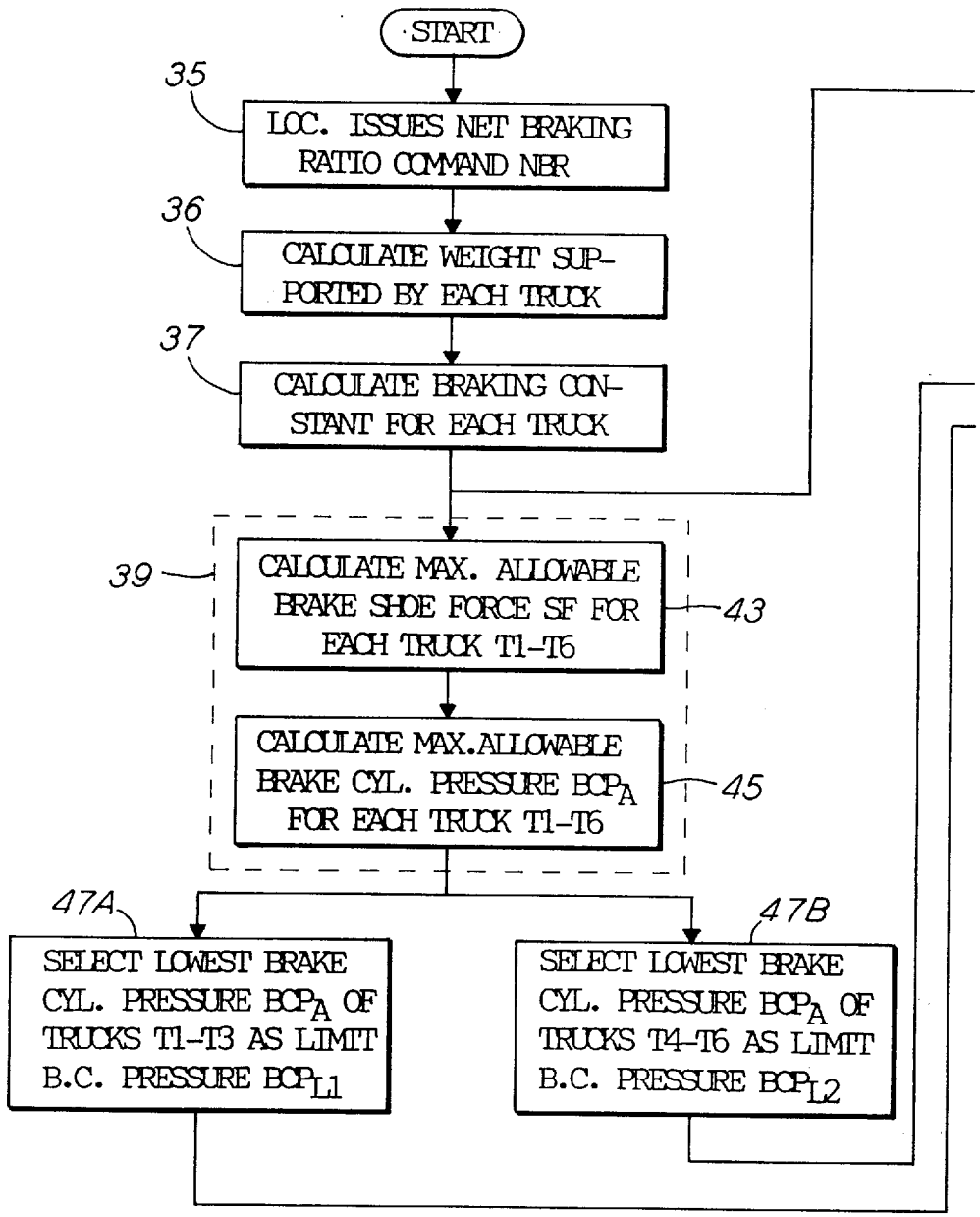

Referring now to the flow chart in FIGS. 5A and 5B, it will be noted that microprocessor MPU1 is programmed to calculate and store a braking constant K for each truck T1–T6, as directed by function blocks 35, 36 and 37, the same as directed by the corresponding function blocks in the embodiment of FIG. 3.

Braking constant K for each truck T1–T6 is used to determine the maximum allowable brake cylinder pressure $BCP_A$ that will not result in a wheel slide condition at that truck, and to determine the brake cylinder pressure $BCP_R$ required to achieve the commanded "5-pack" net braking ratio NBR. The maximum allowable brake cylinder pressure $BCP_A$ is calculated as indicated at function blocks 43 and 45 in sub-routine 39. The required brake cylinder pressure $BCP_R$ is calculated as directed by blocks 49 and 51 in sub-routine 41.

The maximum allowable brake cylinder pressures $BCP_{A1}$ for trucks T1, T2 and T3 are next compared and the lowest pressure is selected as the maximum pressure $BCP_{L1}$ to which each truck T1, T2 and T3 is limited, as indicated at block 47A. The same operation takes place in selecting a limit pressure $BCP_{L2}$ for trucks T3, T4 and T5, as indicated at block 47B.

Having calculated the required "5-pack" brake cylinder pressure $BCP_R$ in accordance with the net braking ratio command NBR via sub-routine 41, and the brake cylinder limit pressures $BCP_{L1}$, $BCP_{L2}$, for the respective truck sets T1, T2, T3 and T4, T5, T6, these pressures $BCP_R$,$BCP_{L1}$ and $BCP_R$,$BCP_{L2}$ are compared and the lower pressure is selected to obtain a desired brake cylinder pressure $BCP_{D1}$, $BCP_{D2}$ for the respective truck sets, as indicated at blocks 53A, 53B.

It will be understood that up to this point, the program of FIGS. 5A and 5B differs from the program of FIG. 3 only in that separate brake cylinder limit pressures $BCP_{L1}$, $BCP_{L2}$ and accordingly different desired brake cylinder pressures $BCP_{D1}$, $BCP_{D2}$ are derived separately for the respective truck sets T1, T2, T3 and T4, T5, T6.

The desired brake cylinder pressure $BCP_{D1}$, $BCP_{D2}$ for the respective truck sets T1, T2, T3 and T4, T5, T6 is next subtracted from the required brake cylinder pressure $BCP_R$ to obtain a pressure shortage $BCP_{S1}$, $BCP_{S2}$ for each respective truck set, as indicated at blocks 63A, 63B.

A corrected brake cylinder pressure $BCP_{C1}$, $BCP_{C2}$ for the respective truck sets is next found by adding a deficit value corresponding to the brake cylinder pressure shortage $BCP_{S1}$, $BCP_{S2}$ of one truck set to the desired brake cylinder pressure $BCP_{D1}$, $BCP_{D2}$ of the other truck set, as indicated at function blocks 65A, 65B. In this manner, the desired brake cylinder pressure $BCP_D$ obtained in accordance with the FIG. 2 embodiment is further corrected to increase the brake cylinder pressure at one truck set in the embodiment of FIG. 4 by an amount corresponding to the difference between the required brake cylinder pressure $BCP_R$ and the limit brake cylinder pressure $BCP_L$ derived for the other truck set. In thus dividing a multi-platform car 10 into two separate brake control systems, so as to increase the desired brake cylinder pressure $BCP_D$ of one truck set, as above discussed, a net braking ratio for the "5-pack" is attained that more closely approaches the commanded net braking ratio NBR than does the net braking ratio realized in accordance with the desired brake cylinder pressure $BCP_D$ derived in the embodiment of FIG. 2.

As directed at function blocks 67A, 67B, the lowest of the corrected brake cylinder pressure $BCP_{C1}$, $BCP_{C2}$ and limit pressure $BCP_{D1}$, $BCP_{D2}$ for the respective truck sets is selected as the new desired brake cylinder pressure $BCP_{N1}$, $BC_{N2}$ thus assuring that no truck experiences excessive brake force to cause a wheel slide, notwithstanding the fact that this new desired brake cylinder pressure $BCP_{N1}$, $BCP_{N2}$ is typically greater than the desired brake cylinder pressure $BCP_{D1}$, $BCP_{D2}$ derived in the embodiment of FIG. 2.

This new desired brake cylinder pressure $BCP_{N1}$, $BCP_{N2}$ for the respective truck sets is compared instantaneously with a feedback signal from transducers X1, X2 corresponding to the existing brake cylinder pressures $BCP_{E1}$, $BCP_{E2}$ of the respective truck sets, as indicated by decision blocks 55A, 55B.

Microprocessor MPU1 thus outputs control signals via wires 9A, 11A and 9B, 11B to operate solenoid valves A1, R1 and A2, R2 such that the pressure in the respective brake cylinder pipe segments 4A, 4B is regulated in accordance with the computed new desired brake cylinder pressure $BCP_{N1}$, $BCP_{N2}$.

In order to better understand how this new desired brake cylinder pressure $BCP_{N1}$, $BCP_{N2}$ for the respective trucks T1, T2, T3 and T4, T5, T6 is derived in accordance with the embodiment of the invention of FIG. 4, the exemplary multi-platform car 10 discussed relative to the embodiment of FIG. 2 will again be considered.

The maximum allowable brake cylinder pressure $BCP_A$ and the required brake cylinder pressure $BCP_R$ discussed relative to the embodiment of FIG. 2 are derived in the same manner in the embodiment of FIG. 4. The maximum allowable brake cylinder pressure $BCP_A$ for truck T1, is 22,414 lbs., for truck T2 is 27,370 lbs., for truck T3 is 9,912 lbs., for truck T4 is 27,370 lbs., for truck T5 is 44,828 lbs., and for truck T6 is 22,414 lbs.

The lowest of these pressures for trucks T1, T2, T3 is selected as the maximum brake cylinder pressure $BCP_{L1}$ at which this first truck set should be limited to assure that none of the trucks T1, T2, T3 experiences a wheel slide. The same is true for trucks T4, T5, T6 comprising the second truck set, which is limited to a maximum brake cylinder pressure $BCP_{L2}$ corresponding to the lowest maximum allowed brake cylinder pressure of trucks T4, T5, T6. In the case of the first truck set, $BCP_{L1}$ is 31.749 psi and in the case of the second truck set, $BCP_{L2}$ is 87.669 psi.

As in the first embodiment of FIG. 2, the desired brake cylinder pressure $BCP_D$ for the first truck set is the lowest of the brake cylinder pressure $BCP_R$ required to meet the NBR command of 0.1 and the brake cylinder limit pressure $BCP_L$. In the case of the first truck set, the limit-brake cylinder pressure $BCP_{L1}$ of 31.749 psi. is lower than the required brake cylinder pressure $BCP_R$ of 37.213 psi and the desired brake cylinder pressure $BCP_{D1}$ thus becomes 31.749 psi. On the other hand, the required brake cylinder pressure $BCP_R$ of 37.213 psi is lower than the limit brake cylinder pressure $BCP_{L2}$ of 87.669 psi derived for the second truck set and thus represents the desired brake cylinder pressure $BCP_{D2}$.

A correction pressure $BCP_{C1}$, $BCP_{C2}$ is next derived for the brake pressure of each truck set based upon the difference between the required brake cylinder pressure $BCP_R$ of 37.213 psi and the brake cylinder limit pressure $BCP_L$.

At each truck set, the amount by which the desired brake cylinder pressure of one truck set is less than the required brake cylinder pressure is determined to obtain a deficit value by which the other truck set brake pressure is increased. In the case of the first truck set, this deficit value $BCP_{S1}$ is found to be 5.464 psi, which is added to the desired brake cylinder pressure $BCP_{D2}$ of the second truck set to obtain a corrected brake cylinder pressure $BCP_{C2}$ of 42.667 psi. In the case of the second truck set, the deficit factor $BCP_{S2}$ is zero, since the limit brake cylinder pressure $BCP_{L2}$ is greater than the required brake cylinder pressure $BCP_R$. Accordingly, there is no further adjustment of the first truck set brake pressure and the corrected brake cylinder pressure $BCP_{C1}$ remains at 31.749 psi.

The lowest of the limit brake cylinder pressure and the corrected brake cylinder pressure for each truck set is now selected as the new desired brake cylinder pressure $BCP_{N1}$, $BCP_{N2}$. In the case of the first truck set, the limit brake cylinder pressure $BCP_{L1}$ is 31.749 psi. The corrected brake cylinder pressure $BCP_{C1}$ is the same so that the new desired brake cylinder pressure $BCP_{N1}$ is 31.749 psi. In the case of the second truck set, the limit brake cylinder pressure $BCP_{L2}$ is 87.669 psi. The corrected brake pressure $BCP_{C2}$ is 42.667 psi, which is less than $BCP_{L2}$ and thus the selected value of the new desired brake cylinder pressure $BCP_{N2}$ becomes 42.667 psi.

Accordingly, the new desired brake cylinder pressure for one truck set in this second embodiment of the invention is increased by a deficit value based upon the decrement of brake cylinder limit pressure relative to the required brake cylinder pressure at the other truck and vice versa, provided such increase does not result in the brake cylinder pressure exceeding the limit pressure for that particular truck set. In this manner, the commanded net braking ratio of 0.1 is achieved for the "5-pack" without the likelihood of a wheel slide occurring.

It will be appreciated, therefor, that this second embodiment of the invention has the capability of precisely achieving a commanded NBR for the multi-platform car 10, or depending upon the load configuration, achieving a net braking ratio that approaches the commanded NBR at least as closely as can be achieved in accordance with the first embodiment of the invention.

We claim:

1. An electro-pneumatic brake system in a multi-platform railroad car having a plurality of trucks for which a common braking pressure is provided comprising:
   a) brake means for each said truck operative in response to said common braking pressure;
   b) a single microprocessor to which is connected a design net braking ratio signal and a load weight signal for each said truck;
   c) means for transmitting a command signal to said microprocessor corresponding to a desired net braking ratio for said multi-platform car;
   d) said microprocessor comprising:
      (i) means for calculating a required brake pressure to meet said net braking ratio command signal;
      (ii) means for calculating a maximum allowable brake pressure for each said truck based on the truck design net braking ratio and the weight supported thereby;
      (iii) means for selecting a limit pressure in accordance with the lowest one of said maximum allowable brake pressures of all said trucks; and
      (iv) means for determining a desired brake pressure in accordance with the lowest one of said required brake pressure and said limit pressure; and
   e) valve means for providing said common braking pressure in accordance with said desired brake pressure.

2. A brake system as recited in claim 1, wherein said brake means for all said plurality of trucks are interconnected with said common braking pressure.

3. A brake system as recited in claim 2, further comprising transducer means for providing a feedback signal to said microprocessor in accordance with the instantaneous value of said common braking pressure.

4. A brake system as recited in claim 3, wherein said microprocessor further comprises means for providing a discrepancy signal in accordance with the difference between said desired brake pressure and said common braking pressure.

5. A brake system as recited in claim 4, wherein said valve means comprises electro-pneumatic valve means having an input subject to said discrepancy signal and an outlet connected to said brake means for providing said common braking pressure.

6. A brake control system as recited in claim 1, wherein said plurality of trucks comprises at least a first truck set having first said brake means interconnected with said common braking pressure and a second truck set having second said brake means interconnected with said common braking pressure separately from said first brake means.

7. A brake system as recited in claim 6, wherein said means for selecting said limit pressure provides a first limit pressure in accordance with the lowest maximum allowed brake pressure of said first brake means and a second limit pressure in accordance with the lowest maximum allowed brake pressure of said second brake means.

8. A brake system as recited in claim 7, wherein said means for determining said desired brake pressure provides a first desired brake pressure in accordance with the lowest one of said required brake pressure and said first limit pressure, and provides a second desired brake pressure in accordance with the lowest one of said required brake pressure and said second limit pressure.

9. A brake system as recited in claim 8, wherein said microprocessor further comprises:

a) means for calculating first and second deficit pressures, said first deficit pressure being based upon the difference between said required brake pressure and said first desired brake pressure, and said second deficit pressure being based upon the difference between said required brake pressure and said second desired brake pressure; and b) means for correcting said first desired brake pressure in accordance with said second deficit pressure and for correcting said second desired brake pressure in accordance with said first deficit pressure.

10. A brake system as recited in claim 9, wherein said microprocessor further comprises means for correcting said first and second desired brake pressures in accordance with respective ones of said second and said first deficit values in such sense as to increase said common braking pressure provided at said first and second brake means.

11. A brake system as recited in claim 10, wherein said microprocessor further comprises means for providing a new first desired pressure in accordance with the lesser of said first desired brake pressure and said first corrected brake pressure, and for providing a new second desired pressure in accordance with the lesser of said second desired brake pressure and said second corrected brake pressure.

12. A brake system as recited in claim 11, further comprising:

a) first transducer means for providing a first feedback signal to said microprocessor corresponding to the instantaneous value of said common braking pressure of said first brake means;

b) second transducer means for providing a second feedback signal to said microprocessor corresponding to the instantaneous value of said common braking pressure of said second brake means.

13. A brake system as recited in claim 11, wherein said microprocessor further comprises means for providing a first discrepancy signal in accordance with the difference between said new first desired pressure and said common braking pressure of said first brake means, and for providing a second discrepancy signal in accordance with the difference between said new second desired pressure and said common braking pressure of said second brake means.

14. A brake system as recited in claim 13, wherein said valve means comprises first and second electro-pneumatic valves each having an input subject to said first discrepancy signal and said second discrepancy signal respectively, and an outlet connected to said first and second brake means respectively for providing said common braking pressure therefor.

\* \* \* \* \*